United States Patent [19]

Lacon

[11] 4,029,461
[45] June 14, 1977

[54] FIBRE FELT FORMING AND CURING DIES

[75] Inventor: John W. Lacon, Sarnia, Canada

[73] Assignee: Fiberglas Canada Limited, Toronto, Canada

[22] Filed: Sept. 10, 1975

[21] Appl. No.: 612,166

[30] Foreign Application Priority Data

Aug. 29, 1975 Canada ............................... 234475

[52] U.S. Cl. ............................. 425/384; 156/466; 156/498; 425/509
[51] Int. Cl.² ......................................... B28B 21/42
[58] Field of Search .......... 156/465, 466, 498, 497; 425/384, 501, 505–509

[56] References Cited

UNITED STATES PATENTS

| 2,068,779 | 1/1937 | Tunley et al. | 165/89 |
| 3,050,106 | 8/1962 | Pusch et al. | 156/218 X |
| 3,147,165 | 9/1964 | Slayter | 425/83 X |
| 3,448,489 | 6/1969 | Boggs | 425/384 X |
| 3,496,610 | 2/1970 | Shelby et al. | 425/384 X |
| 3,912,572 | 10/1975 | Lacon | 156/466 X |

FOREIGN PATENTS OR APPLICATIONS 946,723  5/1974  Canada

Primary Examiner—Richard B. Lazarus

[57] ABSTRACT

A fibre felt forming die assembly and method employ a mandrel having an external forming surface, an outer die extending around the mandrel and having an internal forming surface spaced from the mandrel external forming surface to define a gap for the advance of a felt therebetween. A heater is provided for heating the mandrel to thereby heat and at least partially cure the felt at and adjacent a surface of the felt facing the mandrel as the felt passes through the gap, and hot gas is then discharged through the entire thickness of the felt to further cure the felt. To counteract deposition of bonding material from the felt on the mandrel, an arrangement is provided for cooling the felt prior to the heating of the felt by the mandrel, so that the felt undergoes a rapid temperature transition.

19 Claims, 9 Drawing Figures

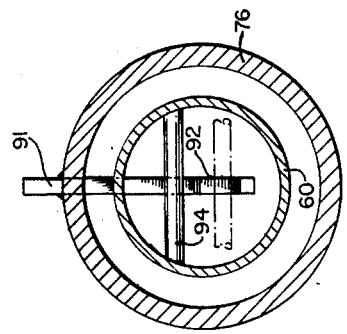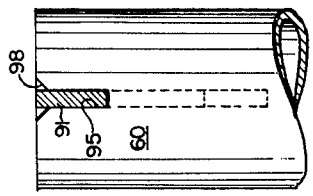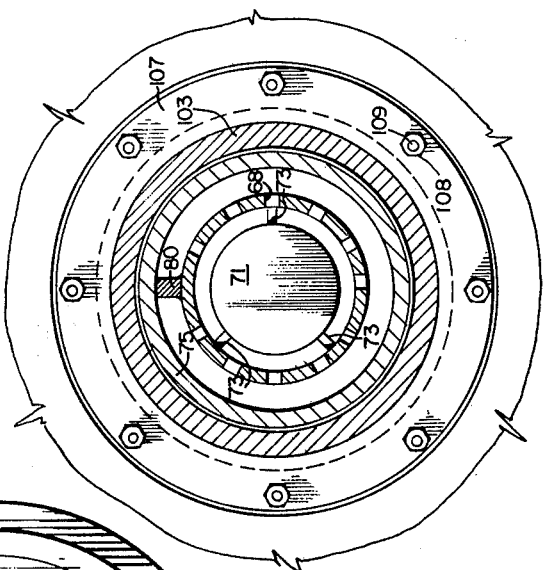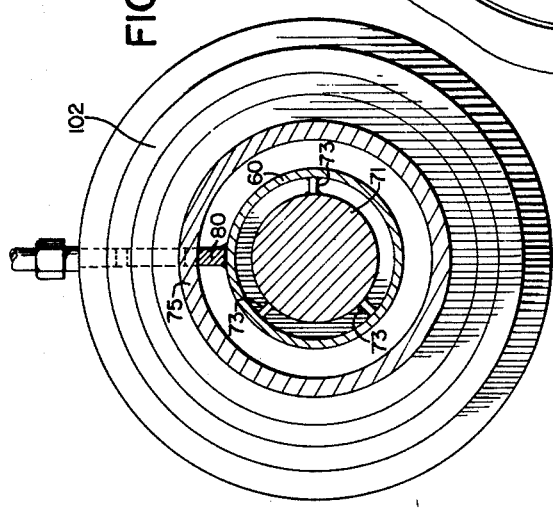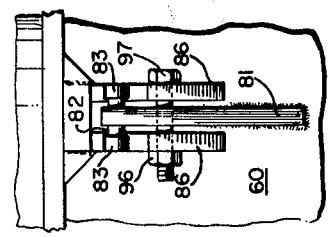

FIBRE FELT FORMING AND CURING DIES

FIELD OF THE INVENTION

The present invention relates to methods of forming and curing fibrous material containing a heat-hardenable bonding material, to apparatus for carrying out such methods, and in particular to fibre felt forming and curing dies.

DESCRIPTION OF THE PRIOR ART

In the manufacture of elongate products, such as pipe insulation, from fibrous material containing a heat-hardenable bonding material, it is necessary to shape or mold the fibrous material to the required product shape and then to heat and thereby cure the bonding material.

The prior art contains numerous proposals for shaping and curing such fibrous material. Generally, this has usually been effected hitherto in batch processes, in which the fibrous material is clamped between two mold halves and then heated. Such batch processes are slow and uneconomic.

Also, various methods have been proposed for winding a strip-shaped felt of the fibrous material in a helical fashion around a mandrel and heating the helically wound felt; but, again, such methods are uneconomic.

In order to improve the rate of production of the products, efforts have been made in recent years to form and mold the fibrous material in a continuous process by passing the fibrous material through a die assembly comprising an inner die or mandrel and an outer die extending around the mandrel, the fibrous material being heated and cured as it is advanced along the mandrel.

For example, U.S. Pat. No. 3,050,106, issued Aug. 21, 1972, to W. G. Pusch et al, disclosed the use of an endless belt carrying a plurality of separate mandrel sections, which are moved successively into contact with a longitudinally advancing felt of fibrous material. The mandrel sections, wrapped by the felt, then move through a tube in a curing oven. However, this method is relatively slow, does not provide a uniform product, and requires expensive sets of mandrels of different dimensions for producing different product sizes.

U.S. Pat. No. 3,147,165, issued Sept. 1, 1964, to G. Slayter, discloses a method of manufacturing pipe insulation in which coated fibres are fed in a loose condition to a screw conveyor, which pushes the fibres between a mandrel and a cylindrical mold extending around the mandrel. The curing of the fibres is effected by discharging hot gas into the fibres from openings in the cylindrical mold and, optionally, in the mandrel. This previously proposed method also has the disadvantage of a relatively slow rate of production and a relatively non-uniform product.

In Canadian Pat. No. 946,723, issued May 7, 1974, to the present Applicant, there is disclosed a method and apparatus for forming articles from a strip-shaped felt of fibrous material containing hardenable bonding material in which the felt is pulled between stationary forming surfaces, which deform the cross-sectional shape of the felt by sliding contact with opposite sides of the felt, and cured while in its deformed state by the discharge of hot gases through the felt. More particularly, the stationary forming surfaces are formed by an inner forming surface and an outer forming surface extending around the inner forming surface, and the hot gas is discharged through the felt from openings in the outer forming surface.

Also, the aforesaid Canadian Pat. No. 946,723 teaches the use of an electric resistance heater for heating the inner forming surface, and thereby initiating curing of the felt, before the hot gas is discharged through the felt.

It has been found in practice that, as the dimensions of the product are increased, and as the rate of production is increased by increasing the speed at which the felt is passed between the inner and outer forming surfaces, there is a tendency for portions of the felt to become detached from the felt and to adhere to the inner forming surfaces. The resultant deposit on the inner forming surface interferes with the sliding of the felt over the inner forming surface and also, since the material of the felt is a heat-insulating material, has the disadvantage of interfering with and reducing the initial curing of the felt by counteracting transfer of heat by conduction from the inner forming surface to the felt.

OBJECTS OF THE INVENTION

It is an object of the present invention to provide a novel and improved fibre felt forming die assembly having inner and outer forming surfaces or dies between which a felt is passed to form the felt, and in which deposition of portions of the felt on the inner forming surface or die is counteracted.

As will be appreciated by those skilled in the art, the bonding material in the felt, prior to curing of the bonding material, is a tacky substance, and the adhesiveness of this bonding material increases as the temperature of the bonding material is increased prior to an increase in such temperature sufficient to cure the bonding material.

It is accordingly a further object of the present invention to ensure that the felt, as it passes toward and along the inner forming surface or die, is subjected to a relatively high temperature gradient to expedite the rate of curing of the bonding material and thereby reduce the time during which the bonding material is tacky.

SUMMARY OF THE INVENTION

According to the present invention, a fibre felt forming die assembly comprises an inner die having an external forming surface, an outer die extending around the inner forming surface, the outer die having an internal forming surface spaced from the external forming surface on the inner die to define a gap for the advance of a felt between the internal and external forming surfaces, and means for heating the external forming surface of the inner die to thereby heat and at least partially cure the felt at and adjacent the surface of the felt facing the external forming surface of the inner die as the felt passes through the gap.

To further cure the felt, means are provided for discharging hot gas through the entire thickness of the felt.

In addition, means are provided for cooling the felt prior to the heating of the felt by the inner die external forming surface, in order to thereby provide the aforementioned high temperature gradient.

Preferably, the inner die is formed by first and second inner die sections, the second inner die section being disposed beyond the first inner die section in the direction of advance of the felt through the gap, the cooling means being associated with the first inner die section, and the heating means being associated with the second inner die section. Consequently, as the felt passes along the inner die, the felt firstly passes over the cooled first inner die section, and the temperature of the bonding material at the first inner die section is maintained relatively low. The felt then passes to the second inner die section, where it is heated, by heat transfer from the second inner die section, to initiate the curing of the felt.

To counteract heat transference from the first inner die section to the second inner die section, heating insulating means are preferably disposed therebetween.

The heating means may comprise means for supplying hot gas to the interior of the second inner die section, and a plurality of openings in the external surface of the second inner die section for discharge of the hot gas against the felt surface.

BRIEF DESCRIPTION OF THE DRAWINGS

The invention will be more readily understood from the following description of a preferred embodiment thereof given, by way of example, with reference to the accompanying drawings, in which:

FIG. 4 shows a view taken in transverse section through the fibre felt forming and curing die portion of FIG. 2 along the line IV—IV;

FIG. 5 shows a view taken in transverse section along the line V—V of FIG. 2;

FIG. 6 shows a view taken in transverse section along the line VI—VI of FIG. 2;

FIG. 7 shows a broken-away view taken in horizontal section along the line VII—VII of FIG. 2 and illustrating one end portion of a mandrel forming part of the fibre felt forming and curing die;

FIG. 8 shows a broken-away plan view in the direction of arrow VIII of FIG. 2.

DETAILED DESCRIPTION OF A PREFERRED EMBODIMENT

Figure 1:
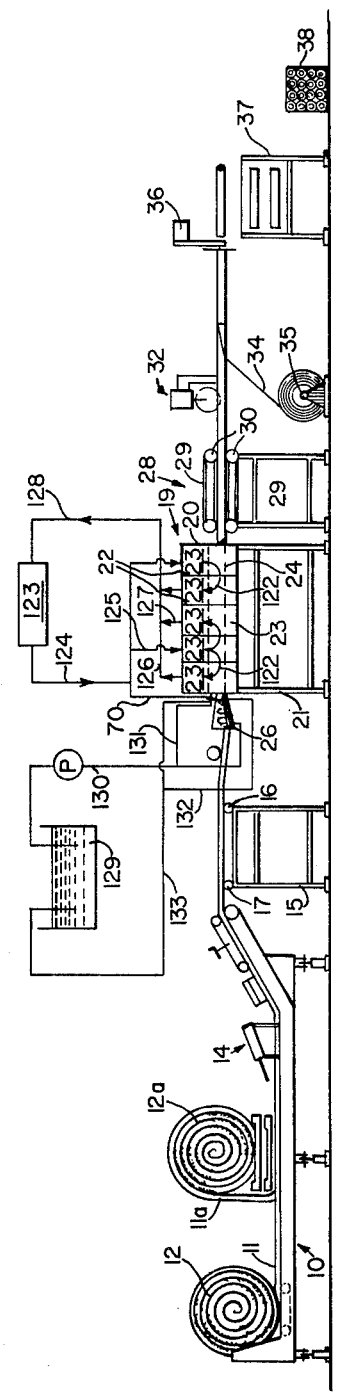
FIG. 1 shows a diagrammatic side view of apparatus for forming fibrous material into pipe insulation.

Referring firstly to FIG. 1 of the accompanying drawings, a pipe insulation forming apparatus illustrated therein has a conveyor, indicated generally by reference numeral 10, for supplying a felt 11 or 11a from a respective reel 12 or 12a, the felts 11 and 11a being of fibrous material, e.g. fiberglass, containing a heat-hardenable bonding material.

When the apparatus is in operation, the conveyor advances one of the felts 11 or 11a from its respective reel until that reel has been exhausted, when the other felt is spliced to the end of the previous felt, by a splicing apparatus indicated generally by reference numeral 14.

For simplification of this description, reference will be made hereinafter simply to the felt 11, although it is to be understood that the felts 11 and 11a are processed in succession and in the same manner after being spliced together as mentioned above.

Beyond the conveyor 10, there is provided an intermediate support 15 having rotatable rollers 16 and 17 for supporting the underside of the felt.

Beyond the support 15, in the direction of advance of the felt 11, there is provided a felt forming and curing section indicated generally by reference numeral 19.

The felt forming and curing section 19 has a curing oven 20, which is supported on a framework 21 and which is divided by four partitions 22 into five gas chambers 23.

A felt forming and curing die illustrated in broken lines and indicated generally by reference numeral 24 extends the length of the oven 20 through the gas chambers 23.

A shoehorn guide 26 is provided for guiding the felt 11 into the felt forming and curing die 24 and for wrapping the felt around a mandrel, which is described in greater detail hereinafter.

Following the felt forming and curing section 19, there is provided a felt feed device, which is indicated generally by reference numeral 28, and which comprises a pair of flexible endless belts 29 guided around rollers 30 for gripping opposite sides of the formed and cured felt and thereby pulling the felt through the felt forming and curing section 19 from beyond the latter.

As will be more readily evident as this description proceeds, the felt 11 has been formed into a rigid, cylindrical shape by the time that it leaves the felt forming and curing section 19 and is gripped by the felt feed mechanism 28. A longitudinal slit is then cut in the formed and cured felt by means of a slitting mechanism indicated generally by reference numeral 32.

A protective covering, e.g. of aluminum foil 34 supplied from a supply reel 35, is then wrapped around and adhered to the formed and cured felt. The apparatus for applying the foil to the exterior of the cylindrical formed and cured felt is well known in the art and is therefore not disclosed herein in greater detail.

After the foil 34 has been applied, the formed and cured felt is cut into sections of predetermined length by a transverse cutting mechanism 36.

The cut sections of formed and cured felt, which are now completed pipe insulation, are deposited in a container 37 for subsequent packing in a box, as indicated by reference numeral 38. The boxed pipe insulation is then ready for storage and/or transportation.

The felt forming and curing section 19 will now be described in greater detail with reference to FIGS. 2 to 9.

Figure 2:
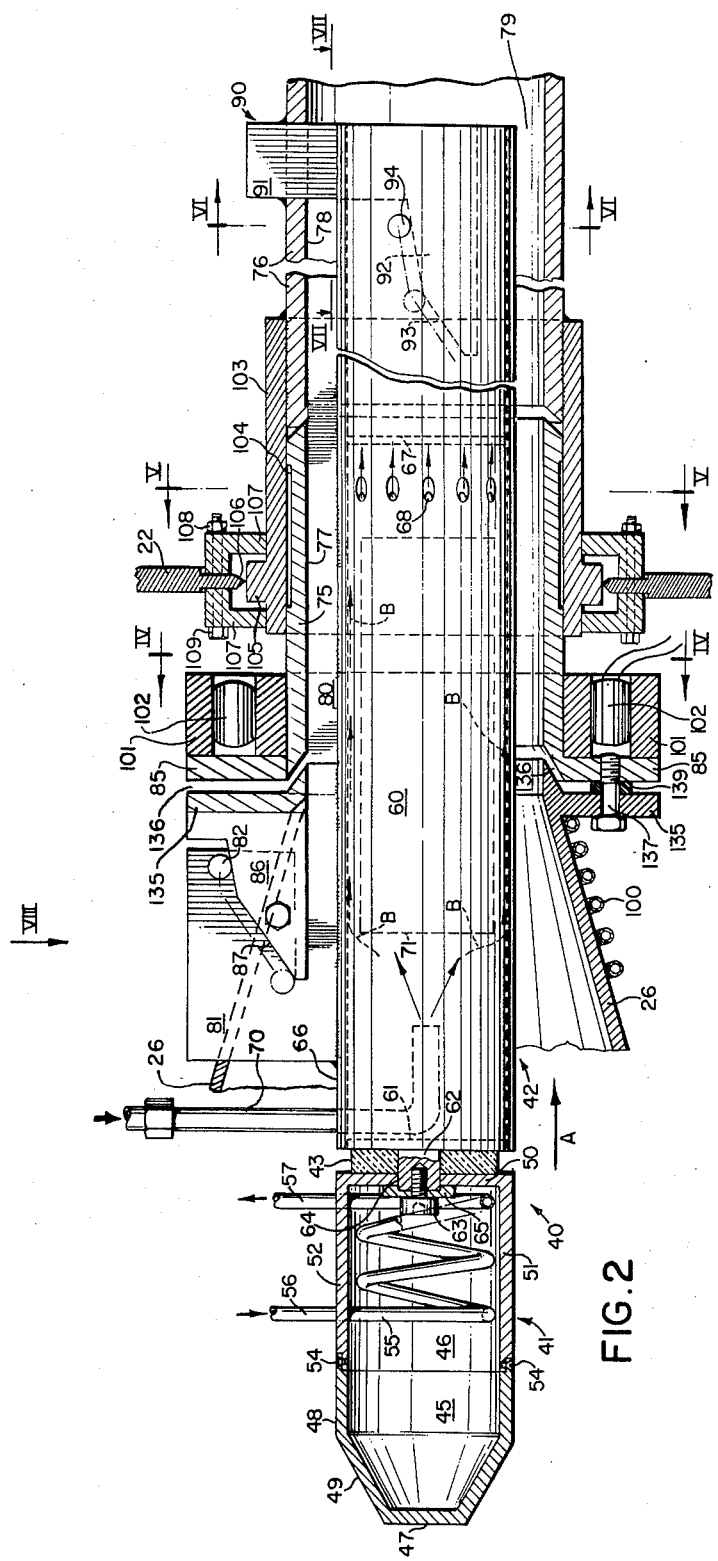
FIG. 2 shows a view taken in longitudinal section through a portion of a fibre felt forming and curing die which is part of the apparatus illustrated in FIG. 1.

FIG. 2 shows the inlet end of the felt forming and curing die assembly, which includes a mandrel, indicated generally by reference numeral 40, projecting into the shoehorn guide 26.

The mandrel 40 comprises a first or nose portion or section 41 and a second portion or section 42, with an annular disc 43 of heat insulating material, e.g. asbestos, disposed between adjacent ends of the nose portion 41 and the second portion 42.

The nose portion 41 is in the form of a hollow housing comprising an outer end housing portion 45 and an inner housing portion 46.

The outer housing portion 45 has a flat, circular end face 47, a cylindrical peripheral outer surface 48 and a frusto-conical surface 49 extending between the surfaces 47 and 48.

The inner housing portion 46 is generally cup-shaped, and has a circular end wall 50 and a cylindrical wall 51 having a cylindrical outer peripheral surface 52 which is of the same diameter as the outer peripheral surface 48 of the outer housing portion 45 and which is in axial alignment with the outer peripheral surface 48 to form therewith an external cylindrical forming surface portion extending from the frusto-conical surface 49 to the circular end wall 50.

The outer housing portion 45 and the inner housing portion 46 have lapped contiguous ends secured together by grub screws 54.

Within the hollow interior of the nose portion 41 there is provided a cooling coil 55, formed of hollow tubing, and a pair of inlet and outlet pipes 56 and 57, which are connected to opposite ends of the cooling coil 55, extend vertically upwardly from the nose portion 41 for the inlet and outlet, respectively, of a cooling fluid.

The second portion 42 of the mandrel 40 comprises a cylindrical wall or tube 60 which is closed at its outer end by a circular closure plate or end wall 61, which is shown in broken lines in FIG. 2.

A boss 62 projecting from the end wall 61, and secured thereto by welding, is in threaded engagement with a bolt 63 extending from the interior of the nose portion 41, the boss 62 projecting through a circular opening 64 in the end wall 50 of the nose portion 41. A recessed washer 65 is fitted over the outer end of the boss 62 between the head of the bolt 63 and the inner surface of the end wall 50 of the nose portion 41. By means of the threaded engagement of the bolt 63 in the outer end of the boss 62, and the fit of the boss 62 in the circular opening 64, the nose portion 41 is readily releasably secured in axial alignment with the second mandrel portion 42, and is supported thereby.

The cylindrical wall or tube 60 of the second mandrel portion 42 has an outer, cylindrical surface 66 of the same diameter as the peripheral surfaces 48 and 52 of the nose portion 41 and which is in axial alignment therewith, the cylindrical surface 66 forming a second external forming surface portion of the mandrel 40.

The inner end of the second mandrel portion 42, i.e. the end opposite from the end wall 61, is open, but a circular closure plate 67, shown in broken lines, is secured by welding across the interior of the cylindrical wall 60 at a spacing from the ends thereof, as can be seen in FIG. 2.

To the left of the closure wall 67, as viewed in FIG. 2, the cylindrical wall 60 is formed with a plurality of gas discharge openings 68, which are outwardly inclined in the direction of advance of the felt through the die indicated by arrow A.

A hot gas supply pipe 70 extends vertically downwardly into the interior of the second mandrel portion 42, and more particularly into a chamber defined by the cylindrical wall 60, the end closure plate 61 and the closure plate 67, and supplies hot gas into this chamber, the hot gas being discharged through the gas discharge openings 68.

Within the cylindrical wall 60, and coaxial therewith, there is provided a cylindrical gas deflector 71 which, as will be more readily apparent from FIGS. 4 and 5, is supported at a spacing from the inner surface of the cylindrical wall 60 by three longitudinally extending support strips 73. The purpose of the gas flow deflector 71 is to deflect the flow of the gas discharged from the hot gas supply pipe 70 radially outwardly against the inner surface of the cylindrical 60, so that the hot gas flows along that surface, as indicated by arrows B in FIG. 2, during passage of the hot gas along the second mandrel section 42 to the gas discharge openings 68 for discharge therefrom. In this way, it is ensured that the hot gases heat the cylindrical wall 60, so that the latter can in turn transfer heat from the external forming surface portion 66 to the felt, as described in greater detail hereinafter.

The mandrel 40 forms an inner die extending into and spaced radially inwardly from an outer die and, in FIG. 2, there is shown an end section 75 and, partially broken away, a second section 76 of the outer die.

The outer die section 75 and 76 are cylindrical and have cylindrical inner surfaces 77 and 78 which form parts of an internal forming surface of the outer die, this internal forming surface being spaced from the external forming surface of the mandrel 40 to provide an almost annular gap 79 for passage of the felt between the outer die and the inner die or mandrel 40.

The almost annular gap 79 is interrupted by a flange or blade 80, which is welded to the top of the cylindrical wall 60 and which projects vertically upwardly therefrom as far as the internal forming surface of the outer die.

At its end nearest the nose portion 41 of the mandrel 40, the blade 80 is formed with a vertical extension 81, through which extends a small shaft 82 carrying, on opposite sides of the blade extension 81, a pair of rollers 83, which can be seen in FIG. 8.

The outer end of the outer die section 75 is formed with a radially outwardly extending flange 85, and a pair of guide plates 86 welded to the outer face of the flange 85 extend, in the longitudinal direction of the die assembly, and at a spacing from one another, at opposite sides of the blade extension 81. Each of the guide plates 86 is formed with an upwardly inclined guide surface 87 underlying a respective one of the rollers 83.

On insertion of the mandrel 40 into the outer die in the longitudinal direction thereof, as described below, the rollers 83 roll upwardly along the inclined guide surfaces 87 to lift and wedge the mandrel 40 in position in the outer die.

At the inner end of the mandrel 40, i.e. the end opposite from the nose portion 41, there is provided an L-shaped bracket indicated generally by reference numeral 90. The L-shaped bracket 90 has a flat, strip-shaped vertical arm 91, which extends vertically downwardly through a wall of the die section 76 and is welded thereto, and a horizontal arm 92 extending to the left, as viewed in FIG. 2, from the inner end of the vertical arm 91. The horizontal arm 92 is provided with an inclined guide surface 93, which is upwardly inclined in the direction of insertion of the mandrel 40 into the outer die, i.e. to the right as viewed in FIG. 2.

A pin 94, secured at opposite ends to the cylindrical wall 60, extends across the hollow interior of the second mandrel portion 42, as shown in FIG. 6, and is disposed at such a height that, on insertion of the mandrel 41 into the outer die, and longitudinal movement of the mandrel 41 to the right, as viewed in FIG. 2, along the outer die, the pin 94 eventually strikes and slides upwardly along the inclined guide surface 93, thus lifting the corresponding end of the mandrel 41 and wedging the blade 80 against the internal forming surface of the outer die to locate the mandrel 41 in its correct, co-axial position in the outer die.

The mandrel is then retained in this position by means of a nut 96 and a bolt 97, the bolt 97 extending through circular openings in the guide plates 86 and in the blade extension 81, as shown in FIG. 8, to secure the mandrel 41 against longitudinal displacement.

As shown in FIG. 7, the top of the cylindrical wall 60 is formed with a slot 95 for receiving the vertical arm 91 of the L-shaped bracket 90, the slot 95 being widened at the corresponding end of the cylindrical wall 60 as indicated by reference numeral 98, to facilitate entry of the vertical arm 91 into the slot 95.

The shoehorn guide 26 is provided, as may be seen from FIG. 2, with external tubing 100, which forms ducts for the flow of a cooling fluid along the external surface of the shoehorn guide 26 for cooling the latter.

An annular collar 101, of aluminum, extends around the outer surface of the outer die section 75 and contains electrical heating elements 102 for heating the die section 75.

The outer die section 76 has welded to the exterior thereof, at its end adjacent the die section 75, a generally cylindrical sleeve 103. The adjacent end of the die section 75, which is received telescopically within the sleeve 103, has a peripheral recess 104 to facilitate insertion thereof into the sleeve 103.

The sleeve 103 is formed with an external annular collar 105, which is engaged and supported by a knife edge 106 extending from the first of the partition walls 22, shown in FIG. 1, of the oven 20. The annular collar 105 is retained from more than limited axial movement relation to the knife edge 106 by two retaining rings 107 secured at opposite sides thereof by means of nuts 108 and bolts 109 of which the latter extend through circular openings in the retaining rings 107 and the partition wall 22. In this way, the outer die sections 75 and 76 are secured together in a manner which allows a small amount of longitudinal movement thereof relative to one another and to the partition wall 22 in response to thermal expansion.

Figure 3:
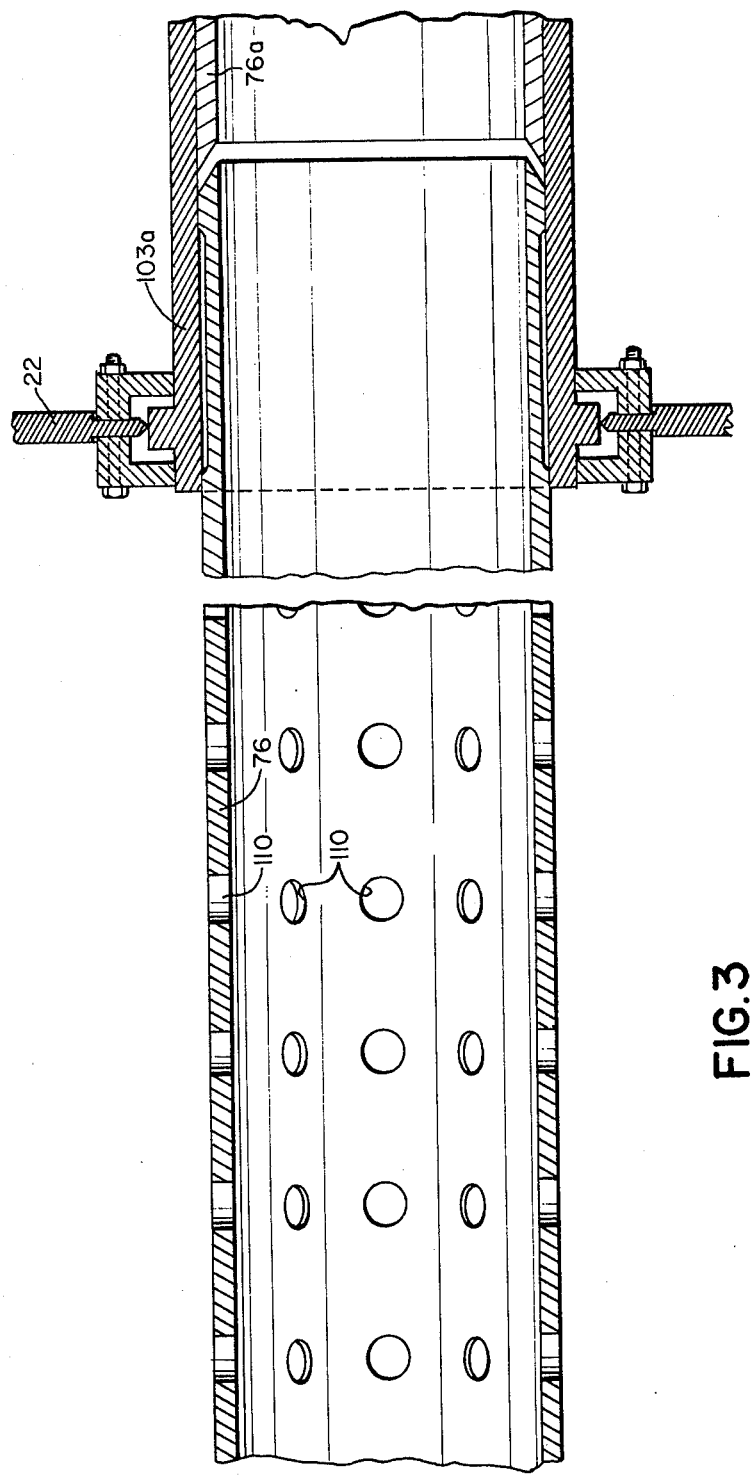
FIG. 3 shows a view in longitudinal section through another portion of the fibre felt forming and curing die of FIG. 1.

Referring now to FIG. 3, it will be seen that the outer die section 76 is similarly telescopically engaged, at its opposite end, in a cylindrical sleeve 103a of a succeeding external die section 76a, the sleeve 103a being similarly retained relative to the next one of the partition walls 22.

As also shown in FIG. 3, the die section 76 is provided with a plurality of gas discharge openings 110.

It will be evident from the above that the external die section 76 extends through the first of the gas flow chambers 23. The outer die 24, as shown in FIG. 1 and as mentioned hereinabove, extends through each of the chambers 23 and, for convenience, may be made in a number of similar sections each extending through one of the chambers 23. Since these sections of the outer die are similar to the die section 76a, it is not considered necessary to illustrate or describe them in greater detail.

Referring again to FIG. 2, it will be seen that the end of the shoehorn guide 26 nearest to the outer die end section 75 is formed with a radially outwardly extending flange 135 and is spaced from the end section 75 by an air gap 136. A bolt 137 extends through the flange 135 and into threaded engagement with a hole in the flange 85 of the end section 75. An annular spacer member 139 of asbestos or other heat insulating material extends around the bolt 137 between the flanges 135 and 85 for spacing the latter apart, and the bolt 137 and spacer member 139 are each one of a plurality of bolts and spacer members spaced angularly around the flanges 135 and 85 and threadeably engaged in the flange 85 for holding the shoehorn guide 26 at a spacing from the end section 75 to maintain the air gap 136 therebetween.

The purpose of the air gap is to counteract heat conduction from the end section 75 to the cooled shoehorn guide 26.

The operation of the above-described apparatus will now be described with reference to FIGS. 1, 2 and 9.

As will be clear from the preceding description, the felt 11 is fed longitudinally through the felt forming and curing section 19 by means of the conveyor 10 and, more particularly, by the pull exerted on the felt by the felt feed mechanism 28 disposed beyond the felt forming and curing section.

As the felt enters the felt forming and curing section 19, and more particularly the die shown in FIG. 2, the cross-section of the longitudinally advancing felt 11 is deformed transversely of the felt initially by the shoehorn guide 26 in order to wrap the felt transversely about the mandrel 40. After being wrapped around the mandrel 40, the felt advances along the almost annular gap 79, the opposite longitudinal edges of the felt sliding along opposite sides of the blade 80.

Figure 9:
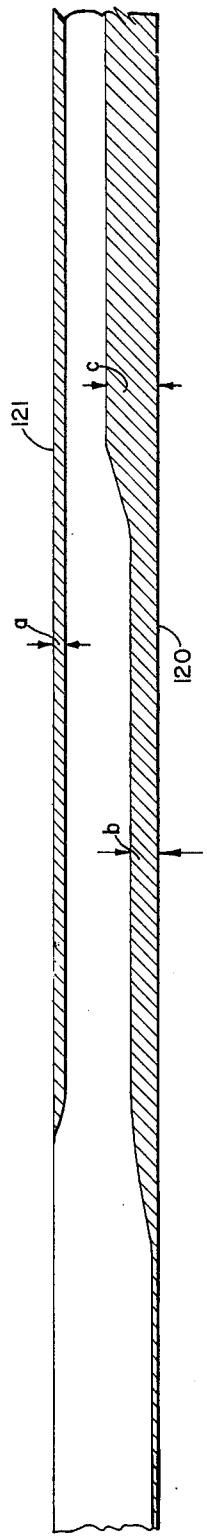
FIG. 9 shows a diagrammatic view taken in longitudinal section through the thickness of a fibrous material felt to illustrate various stages in the curing of the felt.

FIG. 9 shows a diagrammatic longitudinal cross section through the thickness of the felt 11 during the passage of the felt 11 past the mandrel 40. The shaded areas in FIG. 9 represent the cured portions of the thickness of the felt.

Also, in FIG. 9, reference numeral 120 indicates the surface of the felt which slides along the external forming surface of the mandrel 40, while reference numeral 121 indicates the outer surface of the felt, which slides along the internal forming surface of the outer die.

By heat produced by the electrical heating elements 102 in the annular collar 101, transferred by conduction to the outer die section 75 and, from the cylindrical inner surface 77 of the latter to the felt through the outer surface 121 of the felt, a portion of the felt at and adjacent the outer surface 121 is at least partially cured, the thickness of this partially cured portion being indicated by a in FIG. 9.

Similarly, heat transferred to the felt from the outer cylindrical surface 66 of the cylindrical wall 60 of the second mandrel portion 42, and passing by conduction through the inner surface 120 of the felt, at least partially cures a portion of the thickness of the felt at and adjacent the inner felt surface 120, the thickness of this at least partially cured portion being indicated at b in FIG. 9.

Before the felt reaches the second mandrel portion 42, and thus before the initiation of the curing of the thicknesses a and b of the felt, the inner surface 120 of the felt passes the nose portion 41 of the mandrel 40 and is cooled by the cooling effect produced by the cooling fluid flowing through the cooling coil 55. Consequently, this portion of the felt undergoes a relatively rapid increase in temperature, resulting from the relatively high temperature gradient between the nose portion 41 and the second portion 42 of the mandrel 40. Preferably, this temperature rise is arranged such that at the nose portion 41 of the mandrel 40, the temperature of the inner surface 120 of the felt is not more than 70° F. To effect the rapid curing of the thickness b, the temperature of the felt at and adjacent the inner surface 120 is then raised as rapidly as possible to approximately 550° F as the inner surface 120 of the felt advances over the second mandrel portion 42. In this way, the time during which the portion of the felt at and adjacent the inner surface 120 is at a temperature intermediate the two above-mentioned temperature, and thus is in a tacky state in which it has a tendency to form deposits on the mandrel, is reduced to a minimum.

Likewise, the outer surface of the felt 121 is cooled by sliding contact with the inner surface of the shoehorn guide 26 which, in turn, is maintained at a cool temperature by the flow of cooling fluid through the external tubing 100.

As the felt advances past the gas discharge openings 68, the hot gas discharged from the latter passes through the inner surface 120 of the felt and at least partially cures an additional portion of the thickness of the felt, so that the felt is at least partially cured to a thickness $c$ at and adjacent the inner surface 120. This gives the felt a stable configuration so that, as it advances beyond the second mandrel portion 42 and is no longer supported by the latter, the shape of the inner surface 120 remains substantially stable during the subsequent completion of the curing of the felt by the discharge of hot gases through the outer die sections 76, 76a, etc.

The use of the cooled nose portion 41 of the mandrel 40 and of the cooled shoehorn guide 26 have the further advantage that, by maintaining the felt in an uncured state at and adjacent the inner and outer surfaces of the felt for as long as possible during the advance of the felt towards and into the almost annular gap 79, the felt is more readily able to deform or "flow" to the shape required to fit through the gap 79.

The direction of flow of the hot gases in the felt forming and curing section 19 is indicated by arrows 122. These hot gases are supplied from a burner 123 through supply pipes 124 and 125 into the second and fourth gas chambers 23, whence the gases flow radially inwardly through the outer die and through the entire thickness of the felt into the hollow interior of the cylindrically-shaped deformed felt. These gases then flow longitudinally along the hollow interior of the deformed felt and are drawn radially outwardly through the entire thickness of the felt and through the outer die for discharge through outlet pipes 126, 127 and 128, of which the latter conveniently returns to the burner 123 for recirculation of the gases. This arrangement of the flow of the gases may, of course, be varied, depending on the number of the gas chambers 23 provided in the felt forming and curing section, and other possible modifications of the gas flow through the latter will be readily apparent to those skilled in the art.

The supply of cooling fluid, e.g. water, for the cooling coil 55 of the mandrel nose portion 41 and the external tubing 100 is obtained from a storage tank 129 through pipes 130 and 131 employing a pump P, the cooling fluid being returned to the tank 129 through pipes 132 and 133.

I claim:

1. A fibre felt forming die assembly, comprising:
    means for longitudinally advancing a strip-shaped felt of fibrous material containing a heat-hardenable bonding material
    a stationary elongate inner die having an external peripheral forming surface for sliding contact with a first surface of the advancing felt;
    a stationary elongate outer die extending around said inner die;
    said outer die having an internal peripheral forming surface for sliding contact with an opposite, second surface of the felt, said internal forming surface being spaced from said external forming surface on said inner die to define a gap for the advance of the felt between said internal and external forming surfaces;
    said inner die comprising first and second inner die sections;
    said first inner die section being disposed before said second inner die section in the direction of advance of the felt through the gap;
    means for cooling said first inner die section to thereby cool the felt;
    means for heating said second inner die section to thereby heat and at least partially cure the felt at and adjacent the first felt surface;
    heat insulating means between said first and second inner die sections for counteracting the transference of heat from said second inner die section to said first inner die section, whereby the first felt surface undergoes a rapid temperature rise to partially cure the felt at and adjacent the first felt surface as the felt advances past said inner die; and
    means for discharging hot gas through the entire thickness of the felt to further cure the felt.

2. A fibre felt forming die assembly as claimed in claim 1, wherein said heating means comprise:
    means for supplying hot gas to the interior of said second inner die section and
    means defining a plurality of openings in said external surface of said inner die for discharge of the hot gas against the first surface of the felt.

3. A fibre felt forming die assembly as claimed in claim 1, wherein:
    said second inner die section comprises a wall defining a hollow interior;
    said heating means comprise a hot gas flow passage communicating with the hollow interior of said second inner die section for supplying hot gas thereto and
    means defining a plurality of openings in said external surface of said inner die for discharge of the hot gas against the first surface of the felt and
    flow deflector means are provided within the hollow interior and spaced from said wall for deflecting said hot gas flow along said wall.

4. A fiber felt forming die assembly as claimed in claim 1, wherein:
    said cooling means comprise means for supplying a flow of cooling fluid through the interior of said first inner die section.

5. A fibre felt forming die assembly as claimed in claim 1, and further comprising:
    a blade extending longitudinally of said inner die across the gap between said inner and outer dies for forming a slot between opposed edges of the felt.

6. A fibre felt forming die assembly as claimed in claim 1, and further comprising:
    means for heating said outer die at a position before said hot gas discharge means in the direction of advance of the felt.

7. A fibre felt forming die assembly as claimed in claim 1, and further comprising:
    means for locating said inner die in position within said outer die;

said locating means comprising a longitudinally extending guide member on one of said inner die and said outer die and a co-operating slide member positioned on the other of said inner die and said outer die for sliding contact with said inclined guide member on insertion of said inner die through one end of said outer die.

8. A fibre felt forming die assembly as claimed in claim 7, wherein:

said guide member and said slide member form a wedging arrangement for wedging said inner die in said outer die.

9. A fiber felt forming die assembly as claimed in claim 8, and further comprising:

a blade integral with said inner die and extending longitudinally of and outwardly from said external felt forming surface of said inner die to said internal felt forming surface of said outer die;

said blade being wedged against said internal felt forming surface of said outer die by said wedging arrangement formed by said guide member and said slide member.

10. A fibre felt forming die assembly as claimed in claim 7 wherein:

said guide member and said slide member are each one of a pair of guide members and slide members and one of said guide members and its associated slide member are spaced apart along said inner die from the other of said guide members and its associated slide member.

11. A fibre felt forming die assembly as claimed in claim 1, wherein:

said outer die is formed of a plurality of outer die sections;

said outer die sections have telescopically mutually engageable end portions; and readily releasable die support means are provided for supporting said outer die, whereby said outer die is readily replaceable.

12. A fibre felt forming die assembly as claimed in claim 1, wherein:

said hot gas discharge means comprise means defining openings in said outer die for discharging hot gas through said outer die into said felt at a position beyond said inner die in the direction of advance of the felt.

13. A fibre felt forming die assembly as claimed in claim 1, further comprising:

means for heating a portion of said internal forming surface of said outer die;

said forming surface portion extending around said first section of said inner die.

14. A fibre felt forming die assembly as claimed in claim 1 wherein:

said outer die has an inlet end for the entry of the felt into said outer die; and means is provided for heating said inlet end of said outer die.

15. A fibre felt forming die assembly as claimed in claim 1 further comprising:

a strip-shaped projection extending in the longitudinal direction of said inner and outer dies;

said projection being integral with said inner die and abutting said internal forming surface of said outer die.

16. A fiber felt forming die assembly as claimed in claim 1, further comprising a stationary felt guide surface for sliding contact with the second surface of the felt;

said felt guide surface being disposed before, and extending towards, said outer die in the direction of advance of the felt; and means for cooling said felt guide surface.

17. A fibre felt forming die assembly as claimed in claim 16, wherein said felt guide surface is spaced from an adjacent end of said outer die, and means are provided for heating said adjacent end of said outer die.

18. A fibre felt forming die assembly as claimed in claim 16, wherein said felt guide surface is provided on a shoehorn guide.

19. A fibre felt forming die assembly as claimed in claim 1, further comprising:

means for wrapping the felt transversely of the felt around the inner die as the felt advances into the gap; and means for cooling said felt wrapping means.

* * * * *